United States Patent [19]

Siga et al.

[11] Patent Number: 4,778,253
[45] Date of Patent: Oct. 18, 1988

[54] DEVICE FOR RETAINING AN OPTICAL PART

[75] Inventors: Naohito Siga; Naoyuki Seo; Takae Harutake; Michio Shirai, all of Hachioji, Japan

[73] Assignee: Olympus Optical Company Limited, Tokyo, Japan

[21] Appl. No.: 844,357

[22] Filed: Mar. 26, 1986

[30] Foreign Application Priority Data

Mar. 28, 1985 [JP] Japan .................................. 60-64819

[51] Int. Cl.$^4$ .......................... G02B 7/02; G03B 29/00
[52] U.S. Cl. ...................................... 350/252; 522/81; 156/89; 350/96.21
[58] Field of Search ............... 350/252, 253, 321, 582, 350/589, 590, 96.21; 156/275.5, 89; 522/110, 112, 13, 81; 204/157.15, 157.3, 132, 149; 428/522, 913

[56] References Cited

U.S. PATENT DOCUMENTS

| 4,065,624 | 12/1977 | Prucnal et al. | 522/81 |
| 4,275,180 | 6/1981 | Clarke | 522/81 |
| 4,422,891 | 12/1983 | Gonser | 156/89 |
| 4,427,799 | 1/1984 | Orlowski et al. | 522/81 |
| 4,560,457 | 12/1985 | Ogawa | 522/13 |

FOREIGN PATENT DOCUMENTS

| 3525813 | 2/1986 | Fed. Rep. of Germany | 350/252 |
| 60-214318 | 10/1985 | Japan | 350/252 |
| 60-257402 | 12/1985 | Japan | 350/252 |
| 3600781 | 10/1986 | Japan | 350/252 |

*Primary Examiner*—John K. Corbin
*Assistant Examiner*—Loha Ben
*Attorney, Agent, or Firm*—Bruce L. Adams; Van C. Wilks

[57] ABSTRACT

A device for retaining an optical part is disclosed, which comprises an optical element, a holding frame and an adhesive for fixing the optical element to the holding frame. The adhesive comprises an ultraviolet curing type adhesive containing 0.5–20% by weight of a filler.

20 Claims, 1 Drawing Sheet

DEVICE FOR RETAINING AN OPTICAL PART

BACKGROUND OF THE INVENTION

1. Field of the Invention

This invention relates to a device for retaining an optical element or part, and more particularly to an optical part retaining device which can enhance moisture resistance of an adhesive used for fixing the optical part.

2. Prior Art

In general, optical parts such as lens, prism and the like are fixed to a holding frame through an adhesive. As the adhesive, there have hitherto been proposed ultraviolet curing type adhesives capable of well curing in a short time as described, for example, in Japanese Patent laid-open No. 59-228,615. In this case, the ultraviolet curing type adhesive having a semi-fluidity or an easily plastic-deformable flexibility is shaped into pieces having a given size. Then, a plurality of such adhesive pieces 2 are placed in a holding frame 1 along its inner periphery and an optical part (e.g. lens) 3 is inserted into the holding frame 1 as shown in FIG. 4. After the position adjustment, the adhesive piece is cured under the irradiation of ultraviolet ray to fix the optical part 3 to the holding frame 1.

The use of such an ultraviolet curing type adhesive not only facilitates the position adjustment of the optical part but also can perform the quick fixing operation of the optical part held at the exact position in a short time.

However, the ultraviolet curing type adhesive has a drawback that the moisture resistance is poor. For instance, the test for moisture resistance is performed as a link in the chain of the guarantee for the product quality. In such a test, the ultraviolet curing type adhesive for bonding the optical part to the holding frame absorbs a large amount of water to cause swelling, decomposition, interface peeling and the like, resulting in the decrease of adhesion force. Further, the decomposed adhesive flows out or flys in all directions, and consequently it may adhere to the outer surface of the optical part (see symbol A in FIG. 4) to considerably degrade the optical properties. Although the moisture test has hitherto been performed at 49° C. and 95% RH for about 240 hours, severer test conditions of high temperature and humidity are gradually required, which considerably exerts a great influence on the optical properties.

SUMMARY OF THE INVENTION

It is, therefore, an object of the invention to provide a divice for retaining an optical part which solves the aforementioned drawbacks of the prior art.

According to the invention, there is the provision of a device for retaining an optical part by a holding frame through an adhesive, characterized in that the adhesive comprises an ultraviolet curing type adhesive or ultraviolet curing type anaerobic adhesive containing 0.5–20% by weight of a filler. Thus, since the filler has an interfacial function for reducing water absorption by the adhesive and for increasing water discharge from the adhesive, the total water amount contained in the adhesive can be reduced and also water absorbed in the adhesive is rapidly discharged to the outside by the interfacial function of the filler.

DESCRIPTION OF THE PREFERRED EMBODIMENTS

The invention will be described in detail with reference to the accompanying drawings.

Figure 1:
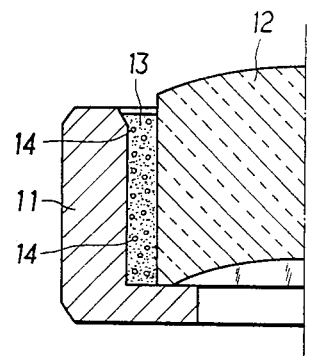
FIGS. 1 to 3 are partial section views of various embodiments of the device for retaining an optical part according to the invention, respectively.

As shown in FIG. 1, a lens 12 as an optical part or element is placed inside of a lens barrel 11 as a holding or supporting frame, and an ultraviolet curing type adhesive 13 is filled in a space between the lens barrel 11 and the lens 12 to fasten them to each other. The ultraviolet curing type adhesive 13 is comprised of a resin such as unsaturated polyester, acrylate, urethanacrylate, epoxy acrylate, polyether acrylate side chain acryloyl type acrylate, polythiol derivative, polythiol spiroacetal, epoxy modified resin or the like.

Further, the ultraviolet curing type adhesive 13 contains particles in the form of an inorganic filler 14. The inorganic filler 14 is composed of powder or fiber made from quartz, glass, asbestos, talc, calcium carbonate, mica, alumina, zinc oxide, aluminum hydroxide, boron nitride or the like. The inorganic filler is added to the ultraviolet curing type adhesive in an amount of 0.5–20% by weight (preferably not more than 1% by weight). In case of adding the powder filler, the filler having a particle size of not more than 80 $\mu$m (preferably not more than 20 $\mu$m) is used, while in case of adding the fiber filler, the filler having a length of not more than 80 $\mu$m (preferably not more than 20 $\mu$m) is used.

When using the filler having a relatively large specific gravity such as zinc oxide, the addition amount of not more than 10% by weight is desirable for ensuring uniform dispersion of the filler.

Moreover, when a plasticizer is added into the ultraviolet curing type adhesive 13, the flexibility or elasticity is imparted to the adhesive, so as to facilitate the position adjustment of the lens 12 and to mitigate stress to improve the properties of the retaining device.

Furthermore, the addition of 0.5–20% by weight (preferably 1% by weight) of a peroxide serves to cure a portion of the adhesive hardly exposed to an ultraviolet ray. Namely, the ultraviolet curing type adhesive is changed to an anaerobic adhesive by the addition of the peroxide. When such an anaerobic adhesive is exposed to an ultraviolet ray, the irradiated portion is cured to shut air and consequently the peroxide acts to polymerize the remaining uncured portion.

In use, it is convenient to previously disperse the filler 14 into the ultraviolet curing type adhesive 13, but the addition of the filler at the time of use is possible. In this case, the filler having a large specific gravity, tends to descend, so that it is necessary to perform a treatment for enhancing the dispersibility of the filler. Further, when the filler is subjected to a coupling treatment, the bonding property of the filler to the adhesive resin can be increased at the time of the curing.

When the optical part retaining device of the above mentioned structure is exposed to high humidity condition, the ultraviolet curing type adhesive 13 is swollen by gradual water absorption. However, the filler 14 is contained in the adhesive 13, so that the total water absorption is decreased according to the amount of the filler. Further, the discharge of water from the ultraviolet curing type adhesive 13 is very rapidly performed by the filler 14 based on the interfacial function of the filler 14.

If such a filler 14 is not contained, water remains in the ultraviolet curing type adhesive 13 for a long time of period, which causes hydrolysis or the like of high molecular chain of the ultraviolet curing type adhesive 13 to form decomposed low molecular weight components. Further, the decomposed components further absorb water to cause the flowing-out or flying phenomenon as described above. Such a phenomenon is particularly conspicuous under a higher temperature and humidity condition.

The following Table 1 shows the experimental results measured in terms of the change of hardness when an ultraviolet curing type adhesive is plasticized by adding a plasticizer and is mixed with various inorganic fillers to form a tablet having a diameter of 30 mm and a thickness of 5 mm and then the resultant tablet is cured and maintained at 70° C. and 80% RH for 168 hours for testing.

TABLE 1

|  |  | Initial hardness (Shore A) | Hardness after the storage test at 70° C. and 80% RH for 168 hours (Shore A) |
| --- | --- | --- | --- |
| Glass powder | 1 wt % | 50 | 49 |
| Zinc oxide | 1 wt % | 45 | 45 |
| Calcium carbonate | 1 wt % | 51 | 49 |
| Talc | 1 wt % | 54 | 40 |
| Boron nitride | 1 wt % | 50 | 18 |
| Alumina | 1 wt % | 50 | 15 |
| Aluminum hydroxide | 1 wt % | 53 | 15 |
| Teflon | 1 wt % | 52 | 40 |
| Aluminum powder | 1 wt % | 53 | 24 |
| No addition |  | 49 | 0 |

As seen from Table 1, the addition of glass powder, calcium carbonate, zinc oxide or talc as the inorganic filler hardly reduces the hardness (occurrence of swelling) and develops a large effect at a small amount.

Figure 2:
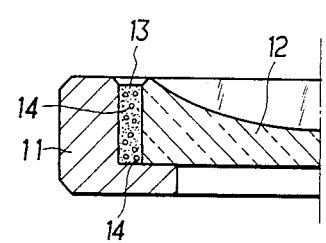

FIG. 2 shows another embodiment in which 1% by weight of glass powder as the inorganic filler 14 is added to the ultraviolet curing type adhesive 13 for bonding the lens 12 to the lens barrel 11. After the resultant mixture is cured and maintained at 70° C. and 80% RH for a given time, the bonding strength and light transmittance were measured in terms of the lapse of time to obtain results as shown in the following Table 2.

TABLE 2

| Filler |  | Initial state | Days of storage test at 70° C. and 80% RH | | | | | |
| --- | --- | --- | --- | --- | --- | --- | --- | --- |
|  |  |  | 5 | 10 | 20 | 30 | 60 | 90 |
| Glass powder 1 wt % | Bonding Strength (kg) | 45.5 | 42.0 | 43.1 | 41.7 | 40.6 | 38.7 | 30.2 |
|  | Transmittance (%) | 100 | 100 | 100 | 100 | 100 | 98 | 95 |
| No addition | Bonding Strength (kg) | 42.3 | 35.5 | 33.9 | 30.2 | 18.6 | 8.1 | 7.1 |
|  | Transmittance (%) | 100 | 100 | 98 | 95 | 90 | 85 | 80 |

The transmittance is measured in terms of relative numerical value when the initial state is 100%.

It is understood from Table 2 that the adhesive containing the filler is superior in the resistance to moisture with respect to bonding strength and transmittance to the adhesive containing no filler.

Further, the same function and effect can be obtained even when a synthetic or organic resin such as tetlon or polytetrafluoroethylene, epoxy resin, phenol resin, polyimide or the like is used as s filler for the ultraviolet curing type adhesive in the form of powder or fiber as described in the above examples.

In this case, it is desirable to soften the adhesive by adding a plasticizer. When teflon or polytetrafluoroethylene powder is used as the filler, it is preferably subjected to a surface treatment with Tetra-H (trade mark, made by Junkosha K.K.) for enhancing the dispersibility to the adhesive.

And also, the similar function and effect can be obtained even when a metal such as aluminum, iron, cobalt, nickel, ferrite, silver or the like is used in the form of powder or fiber as the filler. In this case, the amount of the metal added is 0.5–20% by weight (preferably 1% by weight). Although the metal having a relatively small specific gravity such as aluminum or the like can be added in an amount up to 20% by weight, the metal having a large specific gravity is particularly desirable to be added in an amount of not more than 5% by weight for realizing uniform dispersion.

Figure 3:
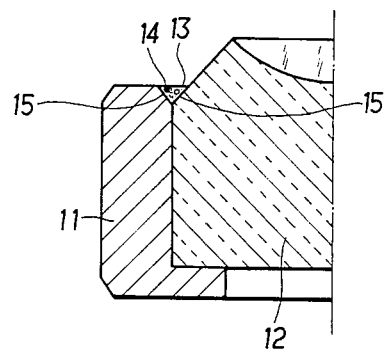
Figure 4:
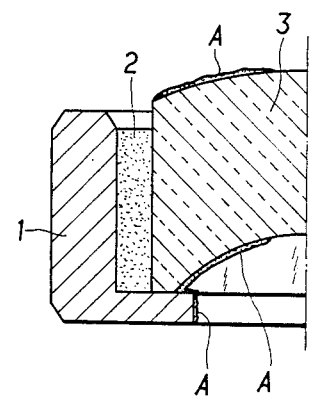
FIG. 4 is a partial section view of the conventional device for retaining an optical part.

Moreover, FIG. 3 shows another embodiment of the invention, wherein the lens 12 is closely mounted in the lens barrel 11 to form a triangular concave groove 15 at the corner portions of the barrel 11 and lens 12 and then the ultraviolet curing type adhesive 13 containing the filler 14 is filled in the concave groove 15. In this case, the addition of the filler 14 can develop the same function and effect as described above.

As mentioned above, in the device for retaining the optical part according to the invention, the given amount of inorganic, metal or synthetic resin filler is added to the ultraviolet curing type adhesive or ultraviolet curing type anaerobic adhesive for fixing the optical part to the holding frame, so that the moisture resistant characteristics of such an adhesive are improved, and particularly the sufficient adhesion force can be maintained even after the test under severe conditions of high temperature and humidity. Further, the degradation of the optical properties in the optical part due to the flowing-out or flying of the decomposed adhesive can be prevented because the swelling and decomposition of the adhesive are prevented by the addition of the filler. Moreover, the filler-containing ultraviolet curing type adhesive or ultraviolet curing type anaerobic adhesive according to the invention has the small shrinkage rate and can suppress the optical strain at minimum.

What is claimed is:

1. A device for retaining an optical element having a holding frame to which said optical element is fixed by means of an adhesive, the improvement wherein said adhesive comprises an ultraviolet ray cured adhesive, and contains a plasticizer for imparting elasticity to the adhesive and 0.5 to 20% by weight of a filler having a size not greater than 80 μm.

2. A device for retaining an optical element according to claim 1; wherein said ultraviolet ray cured adhesive is selected from the group consisting of unsaturated polyester resin, polyester acrylate, urethanacrylate, epoxy acrylate, polyether acrylate, side-chain acryloyl type acrylate, polythiol derivative, polythiol spiroacetal and epoxy modified resin.

3. A device for retaining an optical element according to claim 1; wherein said filler is composed of a material selected from the group consisting of quartz, glass, asbestos, talc, calcium carbonate, mica, alumina, zinc oxide, aluminum hydroxide, boron nitride, aluminum, iron, cobalt, nickel, ferrite and silver.

4. A device for retaining an optical element according to claim 1; wherein said filler is composed of a material selected from the group consisting of Teflon, epoxy resin, phenol resin and polyimide.

5. A device according to claim 4; wherein the supporting means comprises a lens barrel for supporting therein a lens.

6. A device according to claim 5; wherein the lens barrel has an inner peripheral wall spaced from an outer periphery of the lens.

7. A device for retaining an optical element according to claim 1; wherein the ultraviolet ray cured adhesive comprises an anaerobic adhesive containing 0.5 to 20% by weight of peroxide.

8. A device for retaining an optical element according to claim 1; wherein the filler comprises a powdered filler.

9. A device for retaining an optical element according to claim 1; wherein the filler comprises a fibrous filler.

10. A device for retaining an optical element, comprising: supporting means for supporting therein an optical element to define a space between the supporting means and the optical element; and an adhesive resin filled in the space and cured by irradiation of ultraviolet rays to fix the optical element to the supporting means, the adhesive resin containing 0.5 to 20% by weight of particles dispersed therein to impart moisture resistance to the cured adhesive resin.

11. A device according to claim 10; wherein the adhesive resin comprises anaerobic adhesive resin containing 0.5 to 20% by weight of peroxide.

12. A device according to claim 10; wherein the adhesive resin contains a plasticizer for imparting elasticity to the adhesive resin.

13. A device according to claim 10; wherein the adhesive resin is selected from the group consisting of unsaturated polyester resin, polyester acrylate, urethanacrylate, epoxy acrylate, polyether acrylate, side-chain acryloyl type acrylate, polythiol derivative, polythiol spiroacetal and epoxy modified resin.

14. A device according to claim 10; wherein the particles have a size not greater than 80 μm.

15. A device according to claim 14; wherein the particles comprise a filler.

16. A device according to claim 15; wherein the filler comprises a powdered filler.

17. A device according to claim 15; wherein the filler comprises a fibrous filler.

18. A device according to claim 15; wherein the filler comprises inorganic material selected from the group consisting of quartz, glass, asbestos, talc, calcium carbonate, mica, alumina, zinc oxide, aluminum hydroxide, boron nitride, aluminum, iron, cobalt, nickel, ferrite and silver.

19. A device according to claim 15; wherein the filler comprises organic material selected from the group consisting of Teflon, epoxy resin, phenol resin and polyimide.

20. A device according to claim 10; wherein the particles have a surface effective to discharge moisture absorbed in the cured adhesive resin.

* * * * *